United States Patent
Suzuki et al.

(10) Patent No.: US 6,843,819 B2
(45) Date of Patent: Jan. 18, 2005

(54) AIR FILTER

(75) Inventors: Atsushi Suzuki, Hamakita (JP);
Toshinori Oba, Hamakita (JP);
Norihiko Matsushita, Hamakita (JP);
Katsumi Suzuki, Hamakita (JP); Takeo Jo, Tokushima (JP)

(73) Assignees: Toyo Roki Seizo Kabushiki Kaisha, Shizuoka (JP); Awa Paper Mfg. Co., Ltd., Tokushima (JP)

( * ) Notice: Subject to any disclaimer, the term of this patent is extended or adjusted under 35 U.S.C. 154(b) by 0 days.

(21) Appl. No.: 10/031,588

(22) PCT Filed: May 21, 2001

(86) PCT No.: PCT/JP01/04226

§ 371 (c)(1),
(2), (4) Date: Jan. 23, 2002

(87) PCT Pub. No.: WO01/089662

PCT Pub. Date: Nov. 29, 2002

(65) Prior Publication Data

US 2003/0046913 A1 Mar. 13, 2003

(30) Foreign Application Priority Data

May 23, 2000 (JP) ........................................ 2000-151032
May 18, 2001 (JP) ........................................ 2001-149910

(51) Int. Cl.[7] .............................................. B01D 46/10
(52) U.S. Cl. ........................... 55/486; 55/385.3; 55/487; 55/524; 55/528
(58) Field of Search ................................ 55/385.3, 486, 55/487, 524, 528, DIG. 5, DIG. 24, DIG. 28; 428/316.6, 534

(56) References Cited

U.S. PATENT DOCUMENTS

| | | | | |
|---|---|---|---|---|
| 3,210,926 A | * | 10/1965 | Harrington | 60/202 |
| 3,922,437 A | * | 11/1975 | Kitta et al. | 428/383 |
| 4,976,858 A | | 12/1990 | Kadoya | |
| 5,019,140 A | * | 5/1991 | Bowser et al. | 55/486 |
| 5,129,923 A | * | 7/1992 | Hunter et al. | 55/524 |
| 5,573,811 A | * | 11/1996 | Townsley | 55/524 |
| 6,336,947 B1 | | 1/2002 | Atsumi et al. | |
| 2003/0106293 A1 | * | 6/2003 | Tanaka et al. | 55/524 |
| 2003/0150199 A1 | * | 8/2003 | Tanaka et al. | 55/486 |

FOREIGN PATENT DOCUMENTS

| | | | | |
|---|---|---|---|---|
| JP | 55-114323 | * | 9/1980 | ........... B01D/39/18 |
| JP | 63-14886 | * | 4/1988 | ........... B01D/39/18 |
| JP | 2-253815 | | 10/1990 | |
| JP | 6-343809 | | 12/1994 | |
| JP | 11-33319 | | 2/1999 | |
| JP | 11-300124 | | 11/1999 | |
| JP | 2000-70635 | * | 3/2000 | ........... B01D/46/12 |

* cited by examiner

*Primary Examiner*—Duane Smith
*Assistant Examiner*—Jason M. Greene
(74) *Attorney, Agent, or Firm*—Young & Thompson

(57) ABSTRACT

There is provided an air filter, which has a long lifetime and permits to capture effectively carbon particles and reduce costs. The air filter has the first filter layer 11 impregnated with oil and the second filter layer 12, which is provided on the downstream side of the first filter layer 11 and serves as a lipophobic layer having an oil-repellent property. The filter material of the first filter layer 11 has a higher density than the filter material of the second filter material 12.

20 Claims, 9 Drawing Sheets

AIR FILTER

TECHNICAL FIELD

The present invention relates to an air filter, and especially to an air filter, which permits to capture efficiently carbon particles.

BACKGROUND OF THE INVENTION

As an air filter for a vehicle, there has been known a wet-type filter having filter paper impregnated with oil. Viscose oil is generally used as impregnation oil. Accordingly, it is called the "viscose type" air filter. The viscose type air filter has an advantage of extended lifetime in comparison with the dry-type filter, which is not impregnated with oil. In the viscose type air filter, oil on the surface of the filter captures dust and then the oil penetrates into the captured dust so as to provide a function of capturing the other dust on the surface of the captured dust. Such a chain capture of dust permits to increase an amount of captured dust per volume of the filter.

Japanese Utility Model Publication No. S63-27767 describes the improved viscose type air filter. The air filter described in Japanese Utility Model Publication No. S63-27767 is a laminate of the first filter material having a relatively high density and the second filter material having a relatively low density. Such a laminate structure permits to make oil impregnation ratios in the first and second filter materials different from each other, resulting in prevention of clogging of the filter, providing an effective capture of dust.

The wet-type filter impregnated with oil has a problem that carbon particles cannot be captured effectively. The dry-type filter, which is not impregnated with oil, can capture effectively carbon, but has a problem of a decreased amount of captured dust per volume of the filter. Use of non-woven fabric leads may cause problems that dust permeation occurs at a high flow rate and in a serious pulsation and costs increase.

DISCLOSURE OF THE INVENTION

An object of the present invention, which was made in view of the above-described circumstances, is therefore to provide an air filter, which permits to provide a large amount of captured dust per volume of the filter, capture effectively carbon particles and reduce costs.

The present invention will be described below. Reference numerals in the accompanying drawings will be given with parentheses in order to facilitate understanding of the present invention. However, the present invention is not limited only to embodiments as illustrated.

In order to attain the aforementioned object, an air filter (10) comprises: a first filter layer (11) impregnated with oil; and a second filter layer (12) provided on a downstream side of said first filter layer, said second filter layer being composed of a lipophobic layer having an oil-repellent property, each of said first filter layer (11) and said second filter layer (12) being formed of filter paper, filter material of said first filter layer (11) having a higher density than filter material of said second filter layer (12), and said second filter layer (12) being composed of said lipophobic layer over an entire thickness.

According to the present invention, the first filter layer that is formed of the filter paper having the high density and is impregnated with oil, captures dust on the one hand, and the second filter layer that is formed of the filter paper having the low density and subjected to an oil-repellent treatment so as not to be impregnated with oil, captures carbon particles, on the other hand, thus performing effective filtering operations by means of both filter layers. In general, the thickness of the second filter layer is determined on the basis of specification of capturing the carbon particles. According to the present invention, the second filter layer has the oil-repellent property over the entire thickness. Consequently, the oil in the first filter layer is not carried by any portion of the second filter layer in its thickness direction, thus making it possible to cause the second filter layer over its entire thickness to capture effectively the carbon particles. On the contrary, in case where the second filter layer is provided only in the upstream portion with a lipophobic layer, the oil in the first filter layer may penetrate through the lipophobic layer, thus causing a problem that the carbon particles cannot be captured effectively over the entire thickness of the second filter layer. Each of the filter layers is formed of filter paper and it is therefore possible to prevent occurrence of dust permeation at a high flow rate and in a serious pulsation and reduce material cost to the minimum. In addition, the filter material of the first filter material has a higher density than the filter material of the second filter layer and pressure loss can also therefore be minimized.

An embodiment of the present invention is characterized in that said first filter layer and said second filter layer are combined integrally with each other.

According to the present invention, the first filter layer and the second filter layer can be combined integrally with each other, thus providing a simple layer structure. The entire thickness of the filter can be adjusted, as an occasion demands.

An embodiment of the present invention is characterized by further comprising an additional layer.

According to the present invention, the additional layer as included can improve performance of the filter element.

An embodiment of the present invention is characterized in that said first filter layer has a pore size of from 70 $\mu$m to 120 $\mu$m and said second filter layer has a pore size of from 100 $\mu$m to 180 $\mu$m.

Grounds for limiting the pore size of the first filter layer of from 70 $\mu$m to 120 $\mu$m and the pore size of the second filter layer of from 100 $\mu$m to 180 $\mu$m are described below. First, description will be given of grounds for limiting the pore size of the first filter layer of from 70 $\mu$m to 120 $\mu$m. The present inventors made an experiment on an amount of experimental dust established by the JIS (Japanese Industrial Standard) #8, which penetrates through the first filter, while gradually changing the pore size. FIG. 8 shows the results of the experiment. An abscissa denotes the pore size ($\mu$m) and an ordinate shows an amount of captured dust according to the JIS #8, which penetrates the first filter. It is recognized from FIG. 8 that, with the pore size of over 120 $\mu$m, a sieve diameter becomes large so as to increase an amount of the dust, which penetrates the first filter, deteriorating purification efficiency. On the contrary, with the pore size of less than 70 $\mu$m, an amount of the dust, which penetrates the first filter, is rapidly decreased. Consequently, an amount of the dust captured by the first filter rapidly increases, thus decreasing the lifetime of the filter.

Then, description will be given of grounds for limiting the pore size of the second filter layer of from 100 $\mu$m to 180 $\mu$m. The present inventors made an experiment on an amount of carbon, which penetrates through the second filter, while gradually changing the pore size. FIG. 9 shows the results of the experiment. An abscissa denotes the pore size (μm) and an ordinate shows an amount of captured carbon, which penetrates the second filter. It is recognized from FIG. 9 that, with the pore size of over 180 μm, a sieve diameter becomes large so as to increase an amount of the carbon, which penetrates the second filter, deteriorating purification efficiency. On the contrary, with the pore size of less than 100 μm, an amount of the carbon, which penetrates the second filter, is rapidly decreased. Consequently, an amount of the dust captured by the first filter rapidly increases, thus decreasing the lifetime of the filter.

Limiting the pore sizes of the first filter layer and the second filter layer within the above-mentioned ranges makes it possible to increase the lifetime of the filter, without deteriorating purification efficiency of the filter.

An embodiment of the present invention is characterized in that said second filter layer has a downstream end, which is exposed.

According to the present invention, it is possible to prevent oil from adhering to the downstream end of the second filter, permitting a more effective capture of the carbon particles utilizing the second filter layer.

The air filter may be manufactured by subjecting the second filter layer to an oil-repellent treatment and then combining the first filter layer and the second filter layer integrally with each other, or by combining the first filter layer and the second filter layer integrally with each other, subjecting the second filter layer to the oil-repellent treatment and then impregnating the first filter layer with oil.

BEST MODE FOR CARRYING OUT THE INVENTION

Now, embodiments of an air filter of the present invention will be described below with reference to FIGS. 1 to 6.

Figure 1:
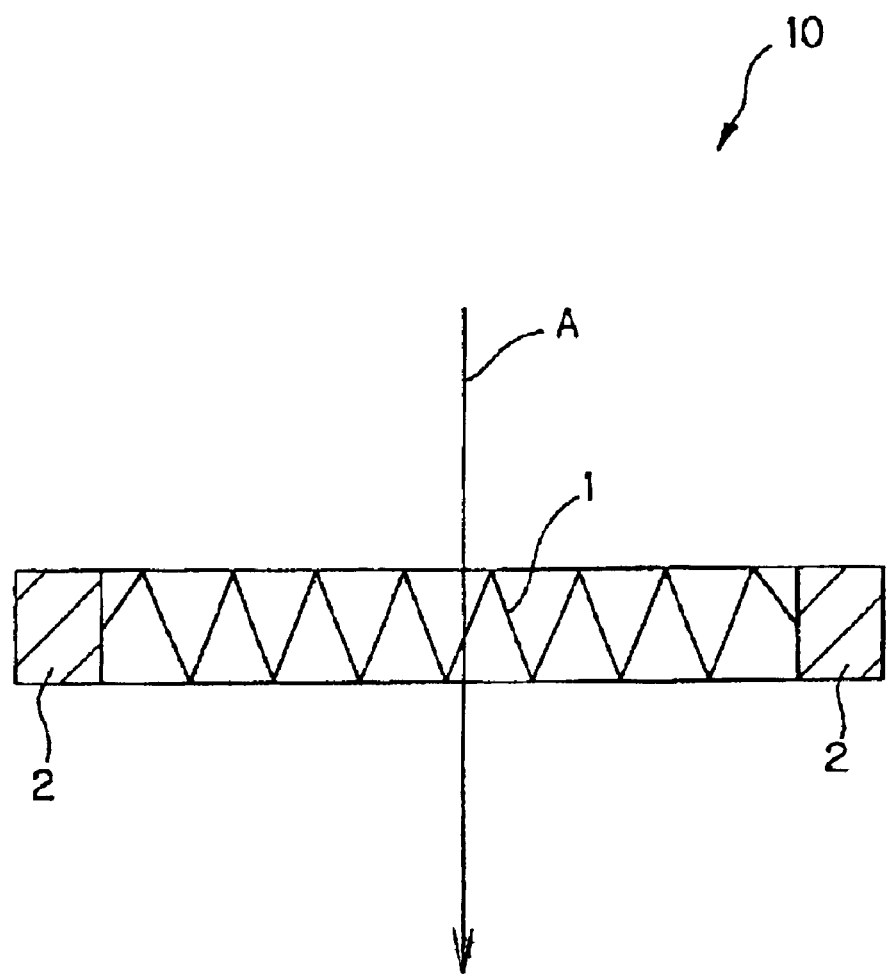
FIG. 1 is a cross-sectional view illustrating an embodiment of an air filter of the present invention.

An air filter 10 as shown in FIG. 1 is composed of a pleated filter element 1 and a frame member 2, which is formed of plastic into a rectangular shape to support the filter element 1. As shown in FIG. 1, the filter element 1 is subjected to an insert injection to form the frame member 2 to which a peripheral portion of the filter element 1 is fixed.

Figure 2:
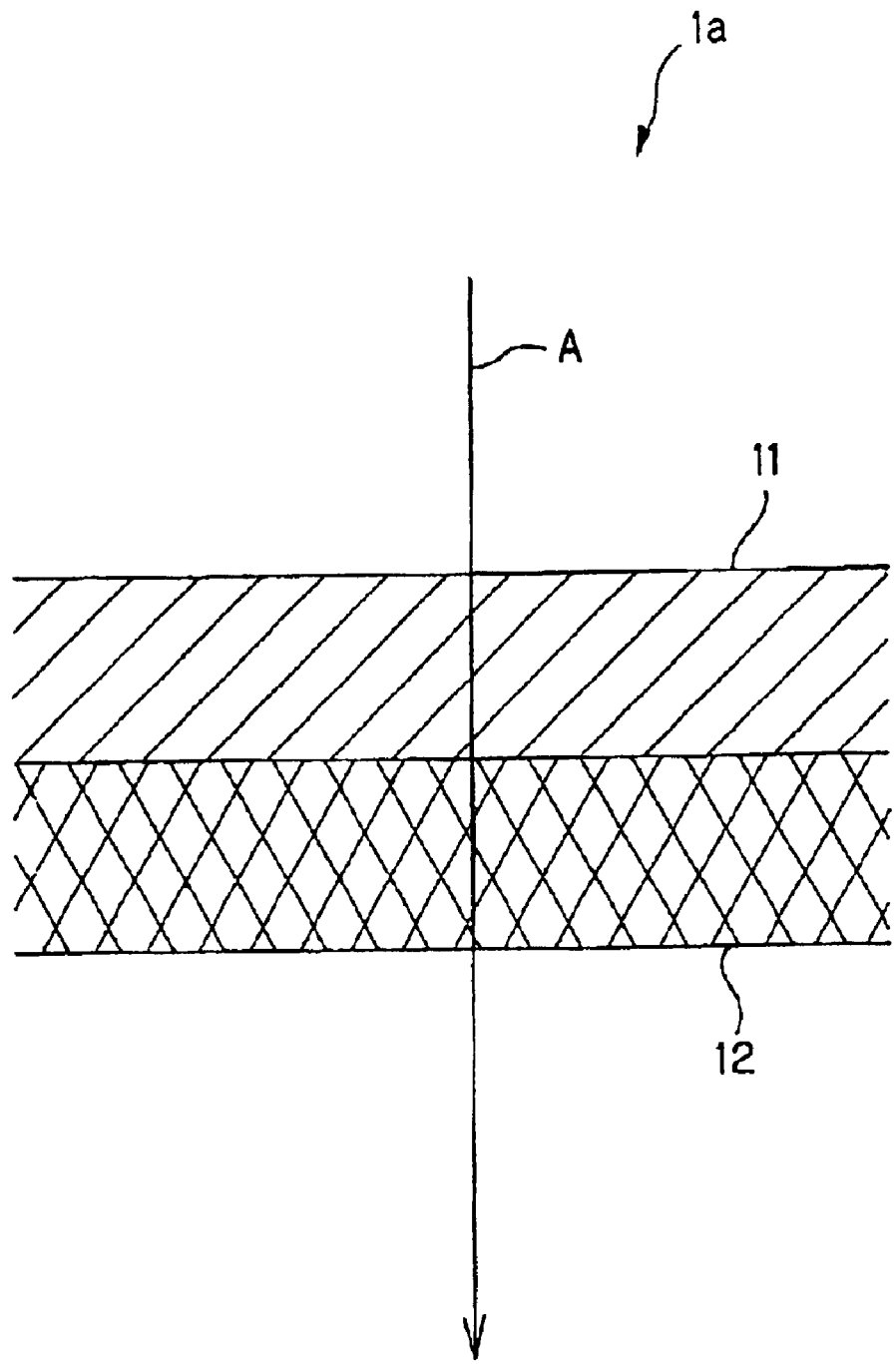
FIG. 2 is a cross-sectional view illustrating a filter element of the first embodiment.

The filter element 1a of the first embodiment as shown in FIG. 2 is provide with the first filter layer 11 having filter element impregnated with oil such as viscose oil and the second filter layer 12, which is composed of a lipophobic layer having an oil-repellent property. Both the first filter layer 11 and the second filter layer 12 are formed of filter paper. The filter material of the first filter layer 11 has a higher density than the filter material of the second filter layer 12. The second filter layer 12 is formed as the lipophobic layer over the entire thickness, i.e., from the upstream-side end face 12a to the downstream-side end face 12b so as to prevent or inhibit oil impregnated in the first filter layer 11 from entering the second filter layer 12 under the function of the oil-repellent property of the lipophobic layer. The downstream-side end face 12b of the second filter layer 12 is exposed to come into contact with air. The upper surface of the first filter layer 11 oozes with the oil impregnated in the first filter layer 11 to provide a condition in which dust can easily be captured. Imparting the oil-repellent property to the second filter layer 12 makes it possible to provide a filter layer for capturing carbon particles, which have not been captured by the first filter layer 11 impregnated with the oil and passed through the first filter layer 11, under the function of contact filtration.

The lipophobic property can be imparted to the second filter layer 12 with the use of material as properly selected, having the oil-repellent property such as filter paper impregnated with fluorine contained resin. The first filter layer to be impregnated with oil by the subsequent step and the second filter layer, which is formed of filter paper to be impregnated with the above-mentioned fluorine contained resin may be combined together in the paper manufacturing process. It is also possible to provide a combined body of the above-mentioned two layers utilizing a method comprising the steps of combining the first filter layer and the second filter layer together (for example into a filter layer having a single layer structure), impregnating the first filter layer (for example the upper half portion of the above-mentioned single filter layer) with oil and applying lipophobic agent to the second filter layer (for example the lower half portion of the above-mentioned single filter layer). In such a case, an application method such as a spraying method, a roller coating method (such as a direct roller coating method and a kiss-roll coating method), a dipping method and the other method is applicable. Such an application method provides advantages of forming the lipophobic layer with an easy process.

Figure 3A:
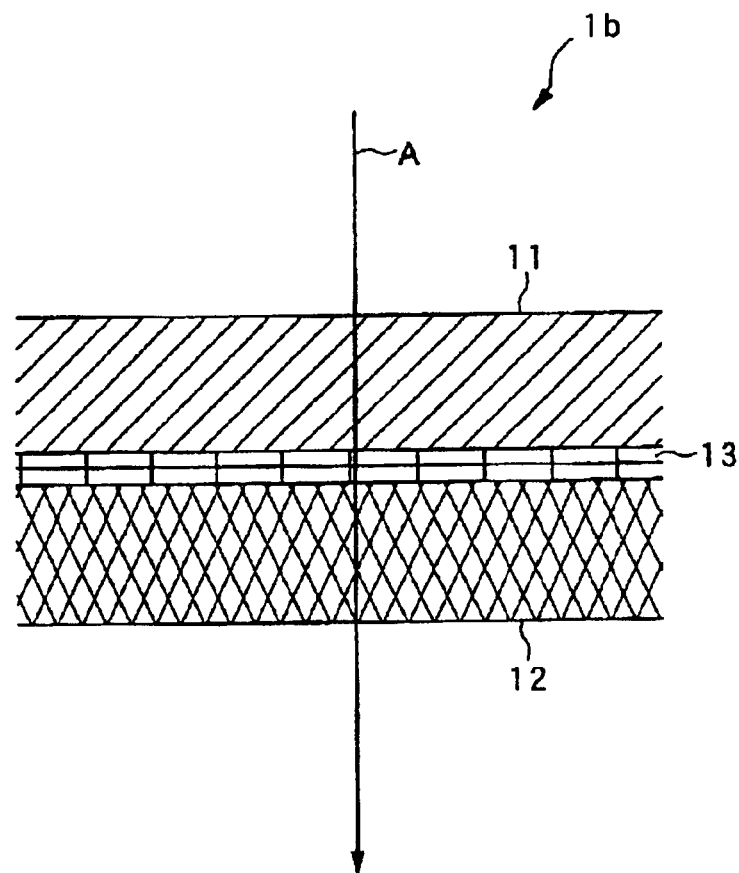
FIG. 3 is a cross-sectional view illustrating the filter element of the second embodiment (FIG. 3(A) shows the filter element as being manufactured and FIG. 3(B) shows the filter element as completely manufactured)
Figure 3B:
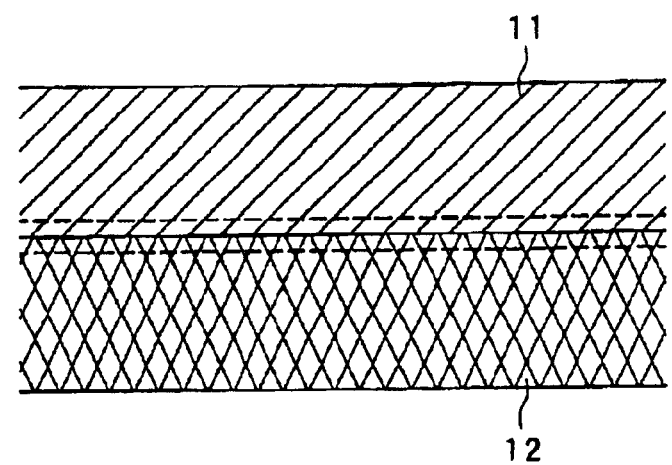

In the second embodiment as shown in FIG. 3(A), the filter element 1b is obtained by combining the first filter layer 11 having the filter material impregnated with oil and the second filter layer 12 composed of the lipophobic layer by an adhesive layer 13. The first filter layer 11 and the second filter layer 12 are joined together so as to permit air to pass through the contacting surfaces of these layers. After completion of the manufacturing steps, the adhesive agent 13 permeates into the first filter layer 11 and the second filter layer 12 so as not to form any gap between the first filter layer 11 and the second filter layer 12 as shown in FIG. 3(B). Also in the embodiment the upper surface of the first filter layer 11 oozes with the oil impregnated in the first filter layer 11 to provide a condition in which dust can easily be captured. Imparting the oil-repellent property to the second filter layer 12 makes it possible to provide a filter layer for capturing carbon particles under the function of contact filtration. The embodiment describes the state in which no gap is formed between the first filter layer 11 and the second filter layer 12 after completion of the manufacturing steps.

The adhesive layer 13 may however be left between the first filter layer 11 and the second filter layer 12 so that these layers 11 and 12 are apart from each other.

In the method for manufacturing the filter element of the embodiment, the first filter element 11 and the second filter element 12 are place one upon another through the adhesive agent to combine them together and then the first filter layer 11 is impregnated with oil.

As the adhesive agent used for the adhesive layer 13, it is preferable to select and use for example a hot-melt material, taking into consideration the manufacturing steps of the filter and conditions under which the filter as manufactured is used. Such a hot-melt material may include olefin material or polyester material.

In the first and second embodiments, an appropriate value may be selected, as the pore size of the first filter layer 11, for example from the range of 70 $\mu$m to 120 $\mu$m in accordance with a performance required for the air filter. The capturing efficiency of dust in the first filter layer 11 is determined so that the filter sieve can capture the dust. Consequently, the value of the pore size is set taking into consideration the particle size of the dust to be captured and pressure loss.

The pore size of the second filter layer 12 having the lipophobic property is set for example to a value within the range of from 100 $\mu$m to 180 $\mu$m. Such a setting leads to the pore size of the entire filter element of 70 $\mu$m to 120 $\mu$m. A reason for using the filter material having a relatively large pore size for the second filter layer 12 is that the second filter layer 12 is to be used to capture carbon particles under the function of contact filtration and it is unnecessary to make the filter material dense. Making the filter material of the second filter layer 12 sparser than the filter material of the first filter layer 11 can rather reduce pressure loss.

Figure 4:
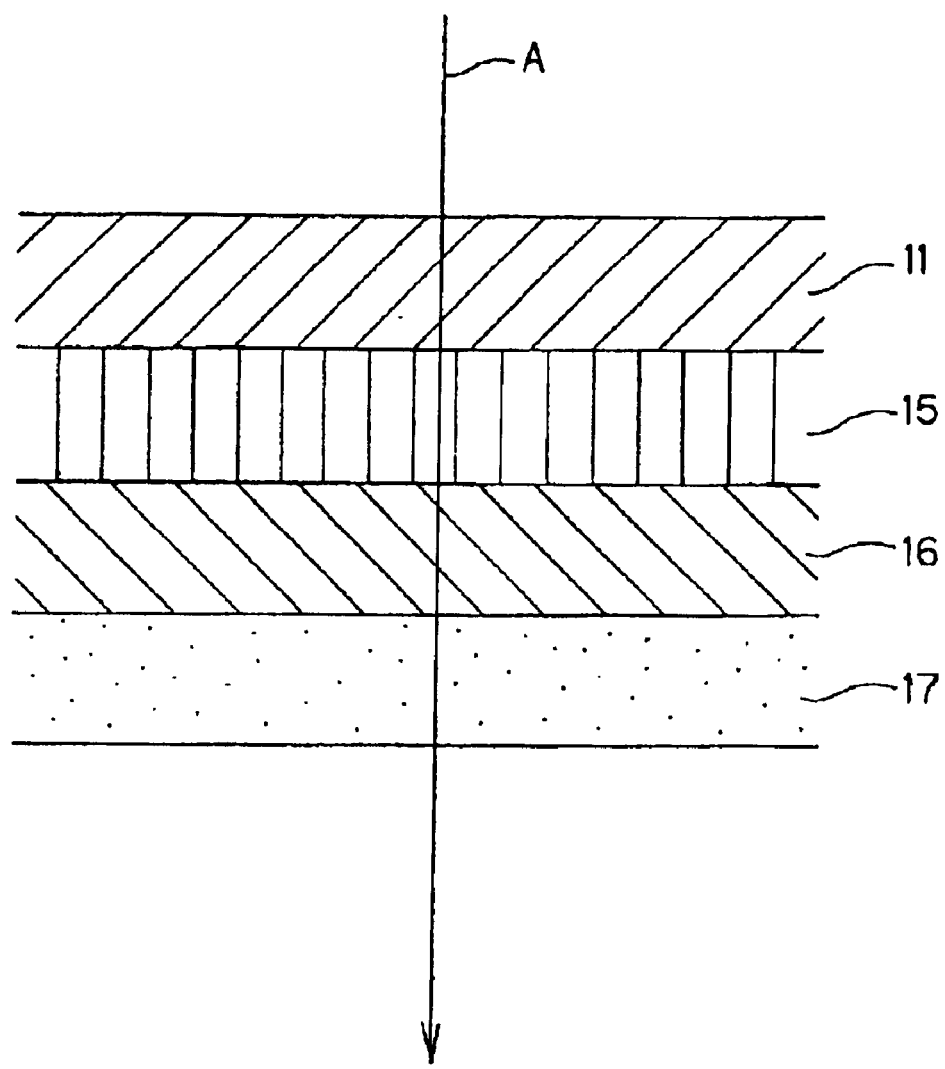
FIG. 4 is a cross-sectional view illustrating the filter element of the third embodiment.
Figure 5A:
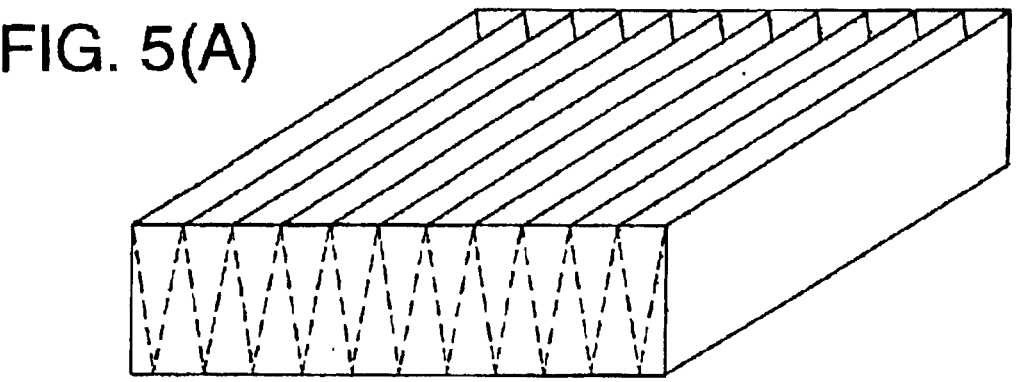
FIG. 5 is a view illustrating generally the filter element of the fourth embodiment.
Figure 5B:
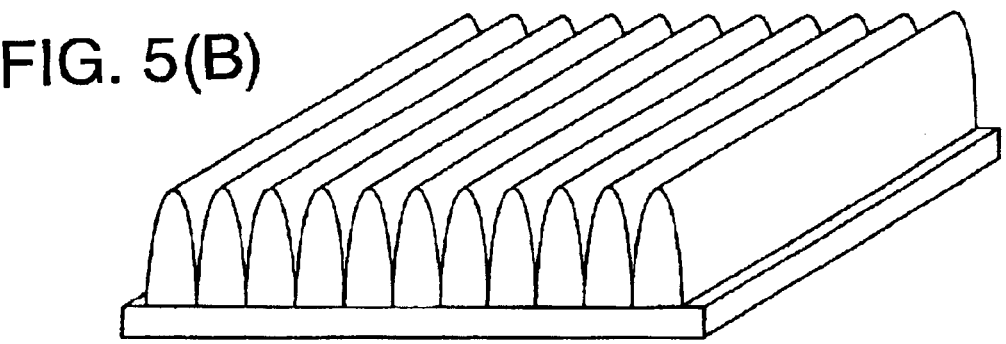
Figure 5C:
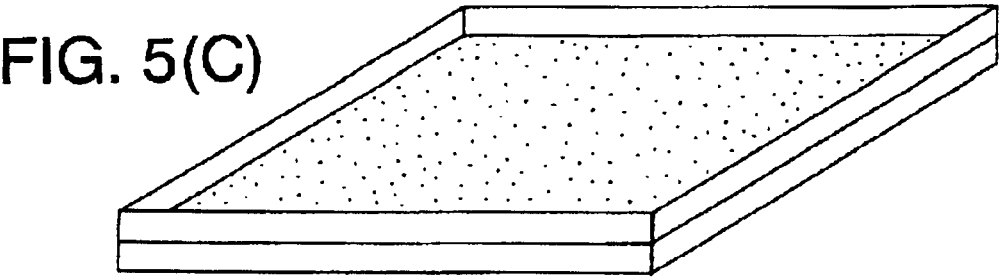
Figure 6A:
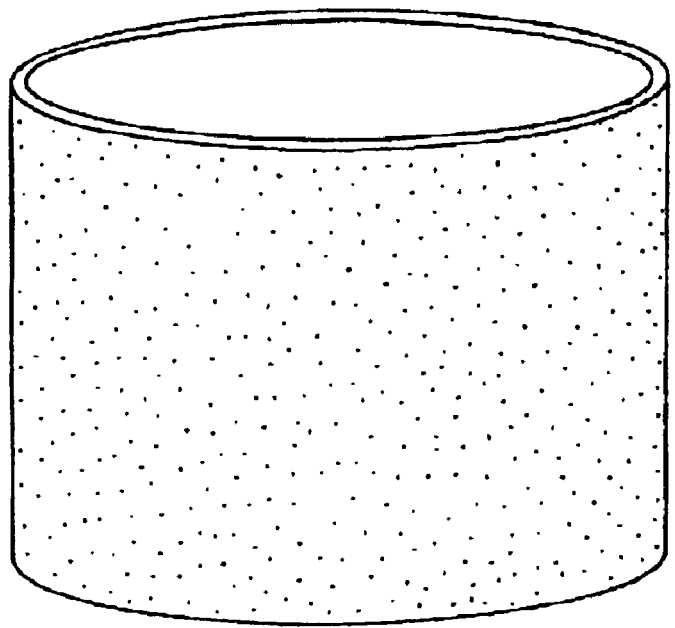
FIG. 6 is a view illustrating generally the filter element of the fifth embodiment.
Figure 6B:
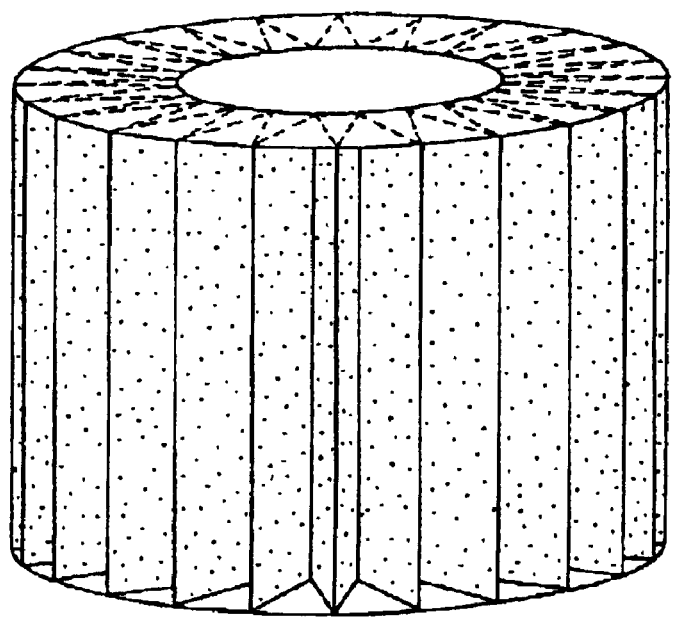

The filter element 1c of the third embodiment as shown in FIG. 4 is provided with the first filter layer 11 having the filter material impregnated with oil, the first intermediate layer 15, the second intermediate layer 16 and a clean layer 17, which are disposed in this order from the upstream side to the down stream side. In the embodiment, the second filter layer composed of the lipophobic layer having the oil-repellent property serves as any one of the first intermediate layer 15, the second intermediate layer 16 and the clean layer 17. With respect to the other layer, material, a pore size, thickness and the other conditions may be determined taking into consideration object of use of the filter. The material for the other layer may be formed for example of filter paper or non-woven fabric. In case where the filter paper is used, a water-repellent treatment applied to it makes it possible to prevent water from being sucked into the inside of an engine, even when a suction port of an intake system is located in a place in which water is easily be sucked.

Now, a filtering operation of the air filter of the embodiment of the present invention will be described. An arrow with a reference symbol "A" in FIGS. 1 to 4 denotes a flowing direction of air. As shown in FIGS. 2 to 4, air first passes through the first filter layer 11 and then through the second filter layer.

As described above, the first filter layer 11 is a wet-type filter layer, which is impregnated with oil. A dense structure of the filter material and existence of oil impregnated therein are essential to effective capture of dust. A condition that the filter layer, which is dense and impregnated with oil, exists so as to face an air passage, is also essential to a sufficient capture of dust. Accordingly, use of the first filter layer 11, which satisfies these conditions, makes it possible to effectively capture dust in the air. However, the filter material impregnated with oil cannot generally provide an effective capturing effect of carbon particles in the air. More specifically, what can effectively be captured by means of the first filter layer 11, is dust other than the carbon particles.

The air, which has passed through the first filter layer 11, enters the second filter layer 12. The second filter layer 12, which is the lipophobic filter having the oil-repellent property and has the sparse (i.e., low density) filter material, can provide an effective capture of the carbon particles. The second filter layer 12 may capture the carbon particles under the function of contact filtration.

According to the air filter of each embodiment of the present invention, the first filter layer 11 effectively captures dust other than carbon particles and the second filter layer 12 effectively captures, over its entirety in the thickness direction, the carbon particles, which have passed through the first filter layer 11. Consequently, the air filter as a whole effectively captures both of the carbon particles and the other dust. In the embodiment of the present invention, the second filter layer 12 captures the carbon particles under the function of contact filtration, unlike the conventional air filter in which the filter materials are disposed so that the density of the filter materials becomes higher in the downstream direction of the flow of air. As a result, it is possible to make the density of the filter material of the second filter layer 12 lower than that of the first filter layer 11, thus reducing pressure loss.

In the wet-type filter, oil generally moves to the downstream side of flow of air through a phenomenon called "carrying off" by air. In the air filter of the embodiment of the present invention, the second filter layer 12 serving as the lipophobic layer is provided on the downstream side of the first filter layer 11. There is ensured a state in which oil does not easily moves to the second filter layer 12 under the function of the oil-repellent property of the lipophobic layer.

In general, an amount of oil impregnated in the filter layer has an influence on the property of capturing carbon particles so that impregnation of the filter layer with oil lower the capturing property. Accordingly, if the second filter layer 12 is impregnated with oil, the carbon particles cannot be captured effectively. In the embodiment of the present invention, the second filter layer 12 is the lipophobic layer as described above so as to prevent the oil from moving. As a result, almost no movement of oil from the first filter layer 11 to the second filter layer 12 occurs. The second filter layer can be kept free from oil, thus making it possible to maintain a high capturing property by which carbon particles can be captured effectively for a long period of time.

In addition, oil does not easily move to the second filter layer 12 and there is no possibility that the oil is carried to the further downstream side of the second filter layer 12. Accordingly, when the air filter of the embodiment of the present invention is mounted on an intake system of an engine for a vehicle, there occurs no inconvenience that the oil is sucked into the downstream side of the air filter. In case where the third filter layer and the fourth filter layer are provided on the downstream side of the second filter layer 12, it is therefore preferable to arrange them so that the densities of these filter layers becomes lower in the flowing direction of air.

In case where the air filters in both embodiments of the present invention are used as an air filter for a vehicle, it is preferable to limit the entire thickness of the filter element 1 within the range of from 0.80 mm to 3.50 mm, and more preferably within the range of from 0.90 mm to 1.75 mm. In such a case, it is preferable to limit the thickness of the first filter layer within the range of from 0.3 mm to 0.75 mm and the second filter layer within the range of from 0.6 mm to 1.00 mm.

In the embodiment of the present invention, the filter element 1 is pleated so as to increase the substantial area of the filter, as shown in FIGS. 1 to 6. The filter element 1 may be used in an extended flat state as shown in FIG. 5(c). FIGS. 5(a) and 5(b) illustrate examples of the filter elements 1, which are pleated into a panel-shaped filter. It is also possible to form the filter elements 1 into a tubular shape and a chrysanthemum shape as shown in FIGS. 6(a) and (b), respectively, so that air can pass through the filter elements 1 from the inside to the outside, and vice versa. The shape of the filter element can be selected freely in such a manner.

when a single bubble first comes from the upper surface of the filter 23 into the isopropyl alcohol.

A pore size ($\mu$m) is obtained on the basis of the thus obtained pressure difference utilizing a conversion table indicated below. The conversion table as conventionally used utilizes a unit "mmaq" for the pressure. A unit "Pa" according to the SI unit system is also indicated in the following table.

TABLE 1

| PRESSURE mmAq | PRESSURE Pa | PORE SIZE $\mu$m | PRESSURE mmAq | PRESSURE Pa | PORE SIZE $\mu$m | PRESSURE mmAq | PRESSURE Pa | PORE SIZE $\mu$m |
|---|---|---|---|---|---|---|---|---|
| 50 | 490.0 | 254.3 | 84 | 823.2 | 128.6 | 118 | 1156.4 | 86.0 |
| 51 | 499.8 | 247.2 | 85 | 833.0 | 126.7 | 119 | 1166.2 | 85.2 |
| 52 | 509.6 | 240.5 | 86 | 842.8 | 124.9 | 120 | 1176.0 | 84.4 |
| 53 | 519.4 | 234.1 | 87 | 852.6 | 123.2 | 121 | 1185.8 | 83.6 |
| 54 | 529.2 | 228.1 | 88 | 862.4 | 121.5 | 122 | 1195.6 | 82.8 |
| 55 | 539.0 | 222.3 | 89 | 872.2 | 119.8 | 123 | 1205.4 | 82.0 |
| 56 | 548.8 | 216.9 | 90 | 882.0 | 118.2 | 124 | 1215.2 | 81.3 |
| 57 | 558.6 | 211.7 | 91 | 891.8 | 116.7 | 125 | 1225.0 | 80.5 |
| 58 | 568.4 | 206.7 | 92 | 901.6 | 115.2 | 126 | 1234.8 | 79.8 |
| 59 | 578.2 | 202.0 | 93 | 911.4 | 113.7 | 127 | 1244.6 | 79.1 |
| 60 | 588.0 | 197.5 | 94 | 921.2 | 112.2 | 128 | 1254.4 | 78.4 |
| 61 | 597.8 | 193.2 | 95 | 931.0 | 110.8 | 129 | 1264.2 | 77.7 |
| 62 | 607.6 | 189.0 | 96 | 940.8 | 109.5 | 130 | 1274.0 | 77.0 |
| 63 | 617.4 | 185.1 | 97 | 950.6 | 108.1 | 131 | 1283.8 | 76.4 |
| 64 | 627.2 | 181.3 | 98 | 960.4 | 106.8 | 132 | 1293.6 | 75.7 |
| 65 | 637.0 | 177.6 | 99 | 970.2 | 105.5 | 133 | 1303.4 | 75.1 |
| 66 | 646.8 | 174.1 | 100 | 980.0 | 104.3 | 134 | 1313.2 | 74.4 |
| 67 | 656.6 | 170.8 | 101 | 989.8 | 103.1 | 135 | 1323.0 | 73.8 |
| 68 | 666.4 | 167.5 | 102 | 999.6 | 101.9 | 136 | 1332.8 | 73.2 |
| 69 | 676.2 | 164.4 | 103 | 1009.4 | 100.7 | 137 | 1342.6 | 72.6 |
| 70 | 686.0 | 161.4 | 104 | 1019.2 | 99.0 | 138 | 1352.4 | 72.0 |
| 71 | 695.8 | 158.5 | 105 | 1029.0 | 98.5 | 139 | 1362.2 | 71.4 |
| 72 | 705.6 | 155.7 | 106 | 1038.8 | 97.4 | 140 | 1372.0 | 70.8 |
| 73 | 715.4 | 153.0 | 107 | 1048.6 | 96.3 | 141 | 1381.8 | 70.3 |
| 74 | 725.2 | 150.4 | 108 | 1058.4 | 95.3 | 142 | 1391.6 | 69.7 |
| 75 | 735.0 | 147.9 | 109 | 1068.2 | 94.3 | 143 | 1401.4 | 69.2 |
| 76 | 744.8 | 145.5 | 110 | 1078.0 | 93.3 | 144 | 1411.2 | 68.5 |
| 77 | 754.6 | 143.1 | 111 | 1087.8 | 92.3 | 145 | 1421.0 | 68.1 |
| 78 | 764.4 | 140.8 | 112 | 1097.6 | 91.4 | 146 | 1430.8 | 67.6 |
| 79 | 774.2 | 138.6 | 113 | 1107.4 | 90.4 | 147 | 1440.6 | 67.1 |
| 80 | 784.0 | 136.5 | 114 | 1117.2 | 89.5 | 148 | 1450.4 | 66.6 |
| 81 | 793.8 | 134.4 | 115 | 1127.0 | 88.6 | 149 | 1460.2 | 66.1 |
| 82 | 803.6 | 132.4 | 116 | 1136.8 | 87.7 | 150 | 1470.0 | 65.8 |
| 83 | 813.4 | 130.4 | 117 | 1146.6 | 86.9 | 151 | 1479.8 | 65.1 |

Figure 7:
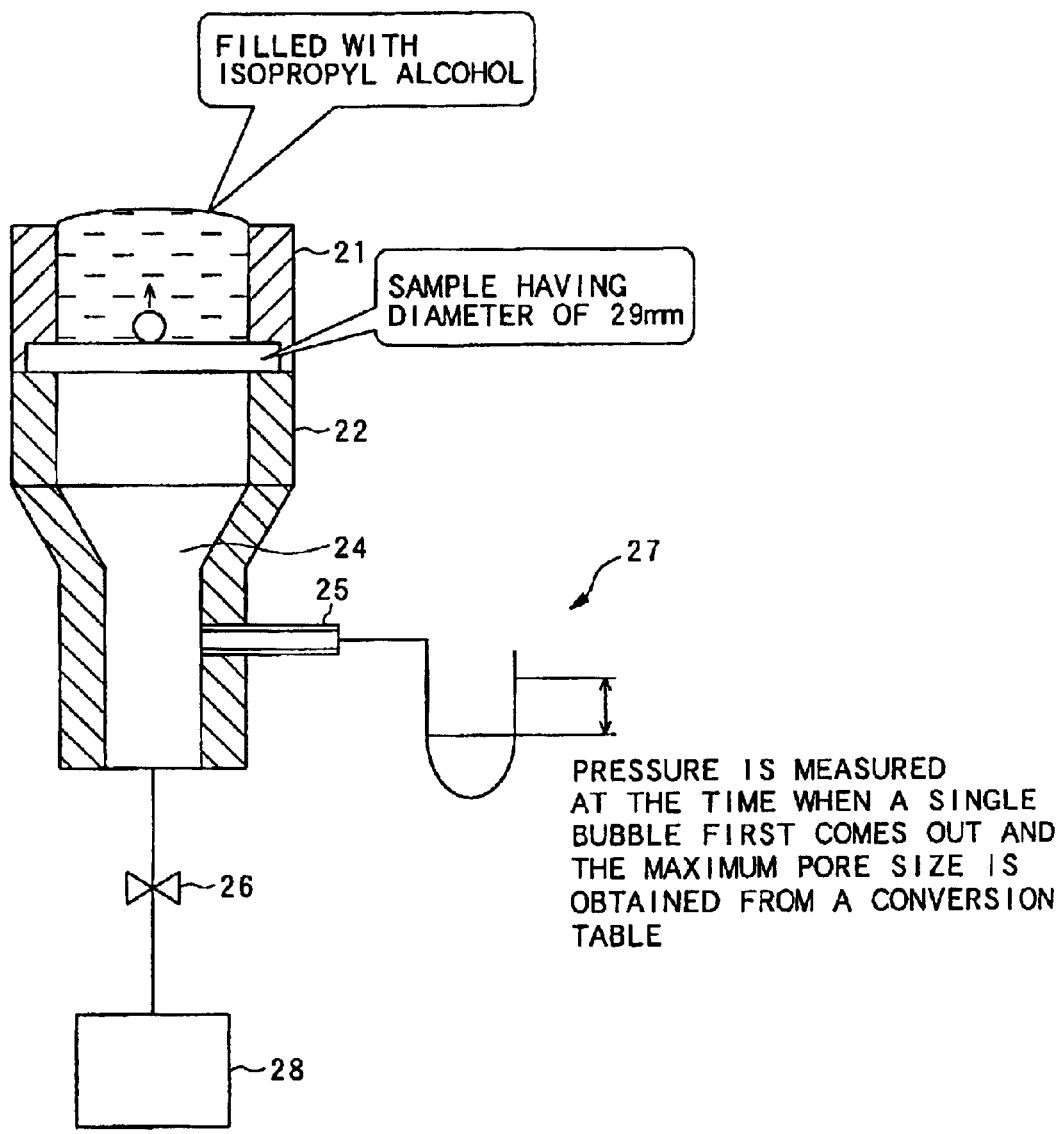
FIG. 7 is a view illustrating a device for measuring a pore size.
Figure 8:
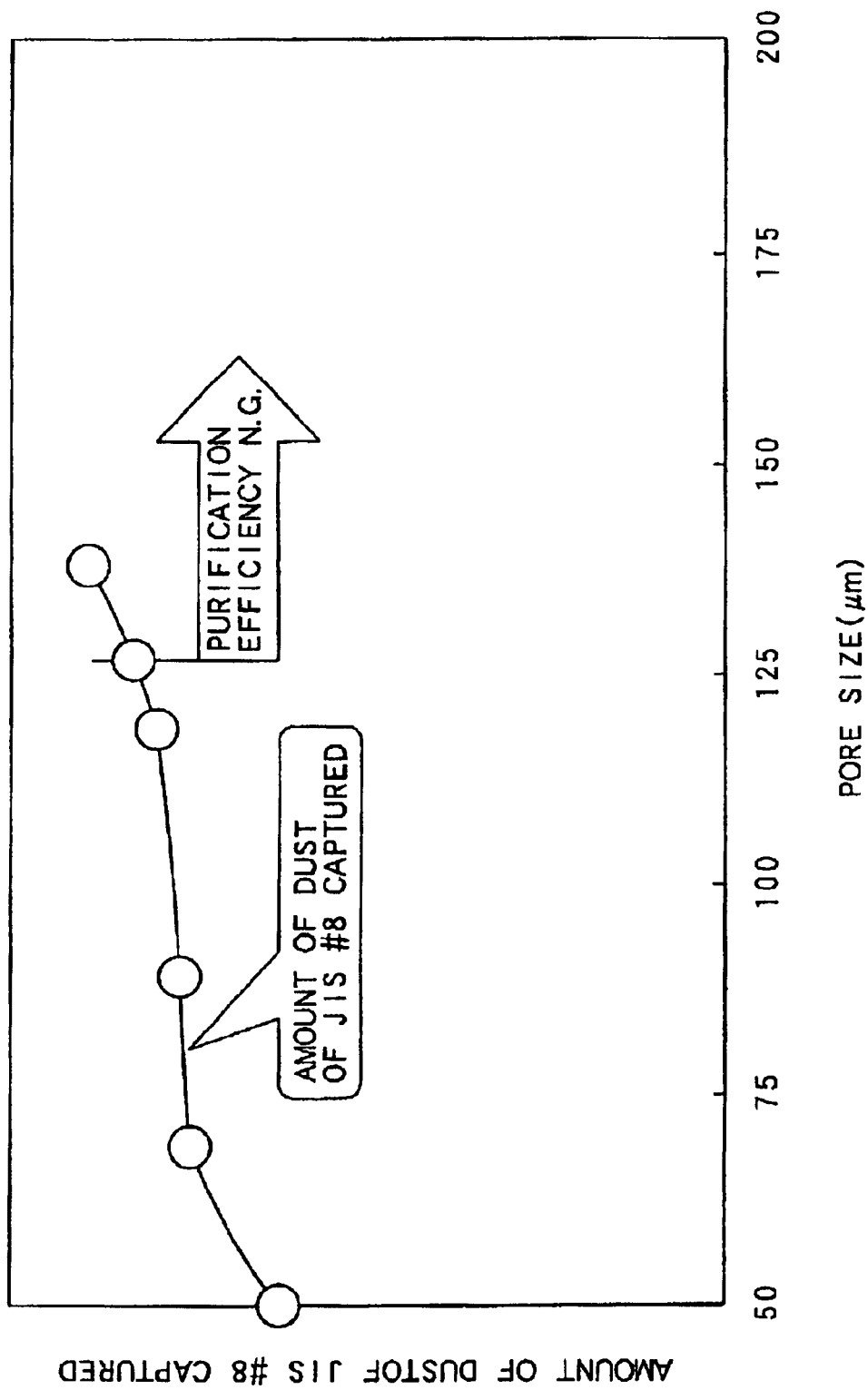
FIG. 8 is a graph illustrating the relationship between the pore size and an amount of dust captured in the first filter layer.
Figure 9:
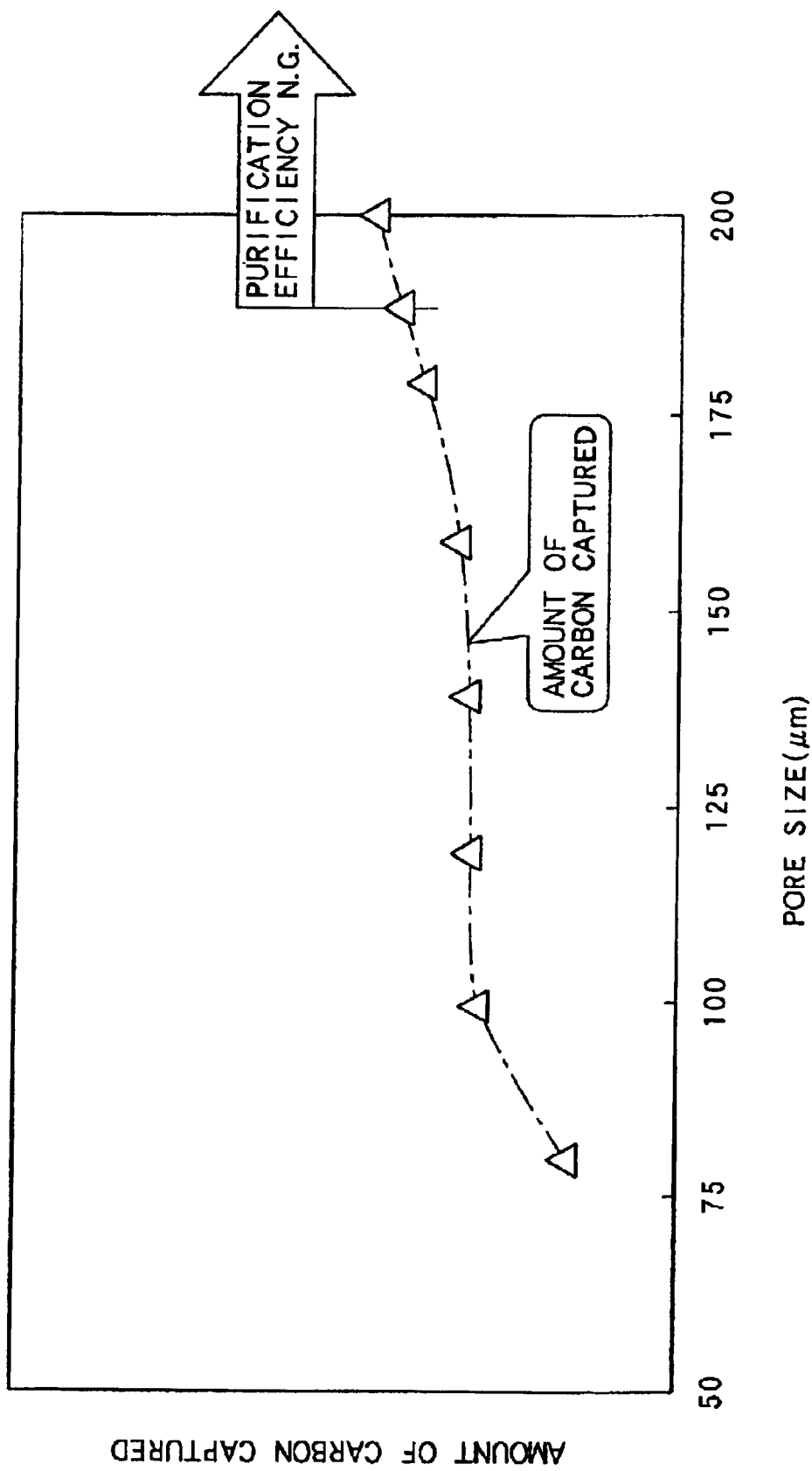
FIG. 9 is a graph illustrating the relationship between the pore size and an amount of carbon captured in the second filter layer.

Brief description will be given below of a testing method for measuring the pore size set forth in the above-described embodiments, with reference to FIG. 7. A disk-shaped filter 23, which serves as an sample and having a diameter of 29 mm, is held air-tightly between two aluminum pipes 21, 22. The lower aluminum pipe 22, which is placed below the filter 23, is provided on the lower end side with a valve 26 for maintaining a constant pressure of air in the pipe 22. The valve 26 is connected to an air supply device 28 having an air compressor.

An air sampler pipe 25 is fitted to the side surface of the aluminum pipe 22. The air sampler pipe 25 is connected to a pressure gauge 27. The pressure gauge 27 can measure the pressure of the inside 24 of the aluminum pipe 22 in this manner.

Prior to measurement of the pore size, the aluminum pipe 21, which is placed above the filter 23, is filled with isopropyl alcohol. The inside 24 of the aluminum pipe 22 is equal to the atmospheric pressure. Then, the valve 26 is gradually opened to supply air from the air supply device 28 so as to gradually increase the pressure of the inside 24 of the aluminum pipe 22. Pressure difference between the atmospheric pressure and the inside 24 of the aluminum pipe 22 is measured utilizing the pressure gauge 27 at the time According to the present invention, the first filter layer, which is formed of a dense filter paper and impregnated with oil, captures dust and the second filter layer, which is formed of a sparse filter paper and is not impregnated with oil, captures carbon particles so that the both filter layers can perform an effective filtration. In addition, the second filter layer has the lipophobic property over its entire thickness. The oil of the first filter layer is not carried to any portion of the second filter layer, thus making it possible for the second filter layer to capture effectively the carbon particles over its entire thickness. Further, the filter material of the second filter layer is sparser than the filter material of first filter layer, thus reducing pressure loss.

What is claimed is:

1. An air filter comprising:
    a first filter layer formed of a first filter paper material having a predetermined density, said first filter layer being impregnated with oil; and
    a second filter layer provided on a downstream side of said first filter layer so as to be independent from said first filter layer, said second filter layer being formed of a second filter paper material having a lower density than said predetermined density of said first filter layer, said second filter layer being impregnated over its entirety with an oil-repellent agent.

2. The air filter as claimed in claim 1, wherein:
said first filter layer and said second filter layer are combined integrally with each other.

3. The air filter as claimed in claim 1, further comprising an additional layer.

4. The air filter as claimed in claim 1, wherein:
said first filter layer has a pore size of from 70 μm to 120 μm and said second filter layer has a pore size of from 100 μm to 180 μm.

5. The air filter as claimed in claim 1, wherein:
said second filter layer has a downstream end, which is exposed.

6. The air filter as claimed in claim 2, wherein:
said second filter layer is subjected to an oil-repellent treatment and then said first filter layer and said second filter layer are combined integrally with each other.

7. The air filter as claimed in claim 2, wherein:
said first filter layer and second filter layer are combined integrally with each other; and then,
said second filter layer is subjected to an oil-repellent treatment and said first filter layer is impregnated with oil.

8. The air filter as claimed in claim 2, further comprising an additional layer.

9. The air filter as claimed in claim 3, wherein:
said first filter layer has a pore size of from 70 μm to 120 μm and said second filter layer has a pore size of from 100 μm to 180 μm.

10. The air filter as claimed in claim 3, wherein:
said second filter layer is subjected to an oil-repellent treatment and then said first filter layer and said second filter layer are combined integrally with each other.

11. The air filter as claimed in claim 3, wherein:
said first filter layer and second filter layer are combined integrally with each other; and then,
said second filter layer is subjected to an oil-repellent treatment and said first filter layer is impregnated with oil.

12. A air filter, comprising:
a first layer of a first filter paper impregnated with oil; and
a second layer of a second filter paper placed in a downstream air direction adjacent the first layer,
a density of the first filter paper being greater than a density of the second filter paper,
the second layer formed as an oil-repellent lipophobic layer over an entire thickness of the second layer.

13. The filter of claim 12, wherein,
a downstream face of the second layer is exposed to air,
an upper, upstream face of the first layer oozes with the oil.

14. The filter of claim 12, wherein the second layer is impregnated with a resin containing fluorine.

15. The filter of claim 12, further comprising:
an adhesive layer binding the first layer with the second layer with the first and second layers contacting one another,
the adhesive layer penetrating a downstream side of the first layer and an upstream side of the second layer.

16. The filter of claim 15, wherein the adhesive layer comprises one of an olefin material and a polyester material.

17. The filter of claim 12, wherein,
the first layer has a pore size of from 70 μm to 120 μm and the second filter layer has a pore size of from 100 μm to 180 μm.

18. A air filter, comprising:
a first layer of a first filter paper impregnated with oil;
a second layer of a second filter paper placed in a downstream air direction contacting the first layer; and
a hot-melt adhesive layer binding the first layer with the second layer, the adhesive layer penetrating a downstream side of the first layer and an upstream side of the second layer,
a density of the first filter paper being greater than a density of the second filter paper,
the second layer formed as an oil-repellent lipophobic layer over an entire thickness of the second layer.

19. The filter of claim 18, wherein the second layer is impregnated with a resin containing fluorine.

20. The filter of claim 18, wherein,
the first layer has a pore size of from 70 μm to 120 μm and the second filter layer has a pore size of from 100 μm to 180 μm.

* * * * *